United States Patent
Serrarens et al.

(10) Patent No.: US 9,156,345 B2
(45) Date of Patent: Oct. 13, 2015

(54) TRANSMISSION FOR AN ELECTRIC OR HYBRID DRIVE

(75) Inventors: Alexander Franciscus Anita Serrarens, JS Waarle (NL); Roell Marie Van Druten, EG Eindhoven (NL); Bas Gerard Vroemen, CP Eindhoven (NL)

(73) Assignee: DTI Group, BV, Eindhoven (NL)

( * ) Notice: Subject to any disclaimer, the term of this patent is extended or adjusted under 35 U.S.C. 154(b) by 0 days.

(21) Appl. No.: 13/255,105

(22) PCT Filed: Mar. 8, 2010

(86) PCT No.: PCT/NL2010/050117
§ 371 (c)(1),
(2), (4) Date: Nov. 22, 2011

(87) PCT Pub. No.: WO2010/101467
PCT Pub. Date: Sep. 10, 2010

(65) Prior Publication Data
US 2012/0058852 A1  Mar. 8, 2012

(30) Foreign Application Priority Data

Mar. 6, 2009 (NL) .................................... 1036671

(51) Int. Cl.
| | |
|---|---|
| *F16H 3/72* | (2006.01) |
| *B60K 6/48* | (2007.10) |
| *B60K 6/38* | (2007.10) |
| *F16H 3/00* | (2006.01) |

(52) U.S. Cl.
CPC ... B60K 6/48 (2013.01); B60K 6/38 (2013.01); *F16H 3/006* (2013.01); *F16H 3/72* (2013.01); *F16H 3/721* (2013.01); *F16H 3/724* (2013.01); *F16H 2200/0034* (2013.01); *F16H 2200/2005* (2013.01); *Y02T 10/6221* (2013.01); *Y10T 74/19051* (2015.01)

(58) Field of Classification Search
CPC ............ B60K 6/38; F16H 3/72; F16H 3/006; F16H 2200/2005; F16H 3/724; F16H 2200/0034
USPC .......... 475/5, 8, 343; 74/330, 331, 340; 477/5
See application file for complete search history.

(56) References Cited

U.S. PATENT DOCUMENTS

| | | | | |
|---|---|---|---|---|
| 4,628,246 | A | * | 12/1986 | Dronen ........................ 322/100 |
| 4,965,463 | A | * | 10/1990 | Maruyama et al. ............ 307/87 |
| 5,761,961 | A | | 6/1998 | Krauss |
| 6,155,364 | A | * | 12/2000 | Nagano et al. ........... 180/65.235 |
| 7,238,132 | B2 | * | 7/2007 | Sowul et al. ....................... 475/5 |
| 7,954,581 | B2 | * | 6/2011 | Tanishima ............... 180/65.275 |
| 8,029,408 | B2 | * | 10/2011 | Seel .................................. 477/5 |

(Continued)

*Primary Examiner* — David J Hlavka
(74) *Attorney, Agent, or Firm* — Eric Karich

(57) ABSTRACT

A transmission which is pre-eminently suitable for an electric and/or hybrid drive has an input which can be connected to an electromotor/generator, and an output which can be connected to a load. The transmission has two parallel transmission paths between the input and output, first coupling means being present in the first transmission path and second coupling means being present in the second transmission path. Furthermore, a gear reduction is present in at least either of the two transmission paths. The first coupling means are arranged such that they are not capable of dissipating significant power and the second coupling means are arranged such that they are capable indeed of dissipating significant power.

13 Claims, 2 Drawing Sheets

(56) References Cited

U.S. PATENT DOCUMENTS

| | | | |
|---|---|---|---|
| 8,152,669 B2* | 4/2012 | Maguire et al. | 475/5 |
| 8,235,857 B2* | 8/2012 | Van Druten et al. | 475/198 |
| 8,475,311 B2* | 7/2013 | Ren et al. | 475/5 |
| 2006/0102409 A1* | 5/2006 | Kamada et al. | 180/249 |
| 2006/0169505 A1* | 8/2006 | Adamis et al. | 180/65.2 |
| 2007/0105678 A1* | 5/2007 | Bucknor et al. | 475/5 |
| 2009/0098969 A1* | 4/2009 | Tabata et al. | 475/5 |
| 2009/0305833 A1 | 12/2009 | Dittrich | |

* cited by examiner

TRANSMISSION FOR AN ELECTRIC OR HYBRID DRIVE

FIELD OF THE INVENTION

The invention relates to a transmission for an electric and/or hybrid drive, which has an input which can be connected to an electromotor/generator and/or combustion engine that forms a main drive, and an output which can be connected to a load, which transmission comprises two parallel transmission paths between the input and output, first coupling means being present in a first one of the two transmission paths and second coupling means being present in the other, second transmission path, and a gear reduction having a non-1 gear ratio being present in at least either of the two transmission paths.

STATE OF THE ART

A transmission of this type is generally known. With this transmission it is possible for the transmission gear ratio at the output to be changed while the torque is maintained.

SUMMARY OF THE INVENTION

It is an object of the invention to provide a transmission of the type defined in the opening paragraph which is pre-eminently suitable for use in an electric and/or hybrid drive. For this purpose the transmission according to the invention is characterised, in that the first coupling means are not capable of dissipating significant power and the second coupling means are. Preferably, the transmission does not have further component parts, which renders it simple and cost effective.

For coupling means that are indeed capable of dissipating significant power there may be thought of a friction clutch or a brake that may be operated in a slipping manner and for coupling means that cannot dissipate significant power there may be thought of a dry friction clutch, a synchromesh or a claw clutch.

The gear reduction is preferably formed by a planetary gear set having at least three rotational members of which a first rotational member is connected to the input and a second rotational member is connected to the output.

An embodiment of the transmission according to the invention is characterised, in that the third rotational member is connected to the first or second coupling means present in the relevant transmission path.

Another embodiment of the transmission according to the invention is characterised, in that the first or second coupling means present in the relevant transmission path is positioned between the third rotational member and either of the other two rotational members.

A further embodiment of the transmission according to the invention is characterised, in that a short-circuit coupling is positioned between the third rotational member and either of the other two rotational members.

The second coupling means are preferably formed by a clutch or a brake, preferably a dry-plate clutch or a dry-plate brake.

The first coupling means preferably comprise a claw clutch or a claw brake and further preferably comprise a freewheel bearing or a synchronisation element.

The first coupling means may also be formed by a friction clutch or a friction brake that cannot dissipate substantial power.

Depending on the further lay-out of the transmission, the planetary gear set forms an accelerating or decelerating gear reduction from the input to the output if the third rotational member is braked.

Furthermore, there is a further gear reduction or transmission present preferably between the output and the load and/or between the input and the main drive.

A still further embodiment of the transmission according to the invention is characterised, in that the second coupling means are formed by a further electromotor/generator. The further electromotor/generator can preferably be connected to the electromotor/generator which forms the main drive.

Furthermore, the transmission then preferably comprises a locking brake which is connected to the further electromotor/generator or to a fourth rotational member of the planetary gear set.

BRIEF DESCRIPTION OF THE DRAWINGS

The invention will be described below in more detail based on embodiments of the transmission according to the invention represented in the drawing figures, in which.

DETAILED DESCRIPTION OF THE DRAWINGS

Figure 1:
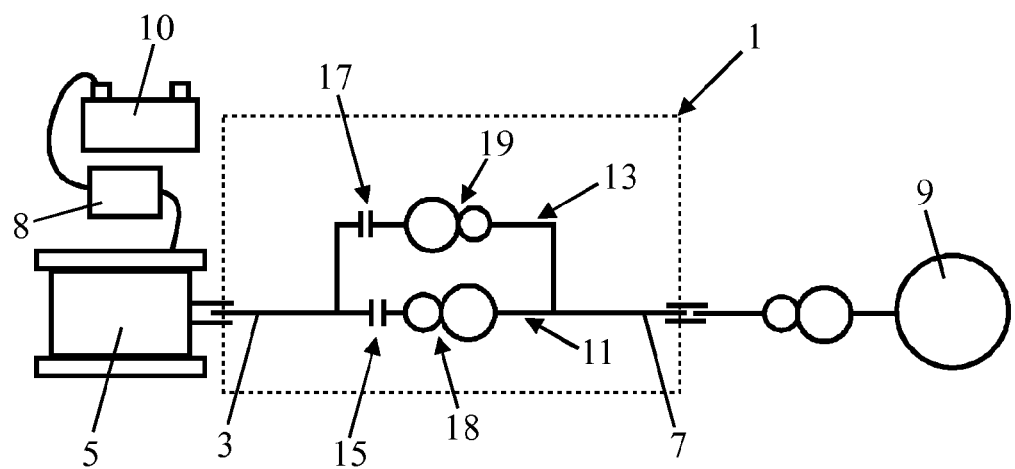
FIG. 1 shows a first embodiment of the transmission in which the couplings are formed by plate clutches and the gear reductions by gear pairs.

FIG. 1 shows a first embodiment of the transmission according to the invention. This transmission 1 is pre-eminently suitable for an electric drive and has an input 3 which can be connected to an electromotor/generator 5 which forms a main drive, and an output 7 which can be connected to a load 9. The electromotor/generator is connected to an accumulator 10 via power electronics 8. The transmission 1 comprises two parallel transmission paths 11, 13 between the input and output, first coupling means 15 being present in the first transmission path 11 and second coupling means 17 being present in the second transmission path 13. Each transmission path has a gear reduction 18, 19 with mutually different gear ratios. The first coupling means 15 are arranged such that they are not capable of dissipating significant power and are formed in this embodiment by a dry plate clutch, and the second coupling means 17 are arranged such that they are capable indeed of dissipating significant power and are formed in this embodiment by a friction clutch that can be operated in slipping manner.

Figure 2:
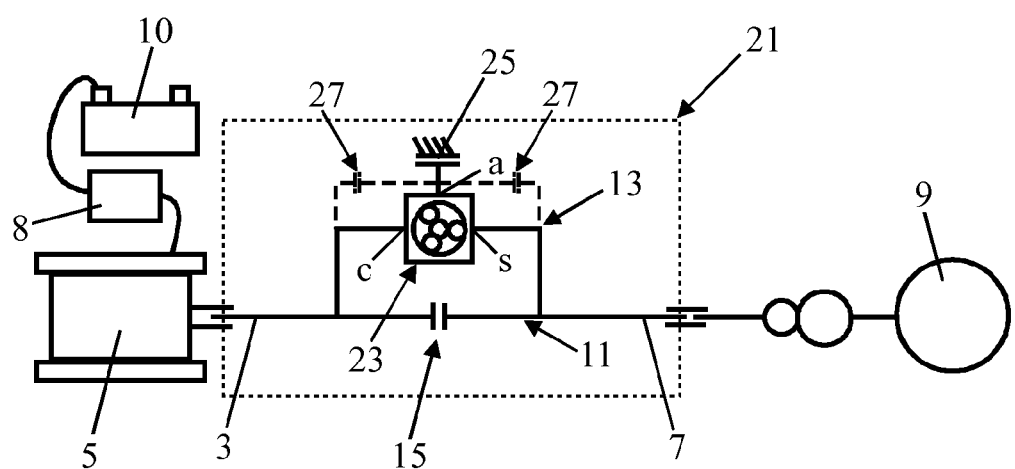
FIG. 2 shows a second embodiment of the transmission in which the gear reduction in the second transmission path is formed by a planetary gear set and the coupling by a brake.

FIG. 2 shows a second embodiment of the transmission according to the invention. All components that are equal to those of the first embodiment are designated by like reference numerals. For this transmission 21 only the first coupling means 15 are positioned in the first transmission path 11 whereas the gear reduction and the second coupling means in the second transmission path 13 are formed by a planetary gear set 23 comprising three rotational members a, c and s of which a first rotational member c is connected to the input 3, a second rotational member s is connected to the output 7 and a third rotational member a is formed by an annulus and is connected to a friction brake 25 which forms the second coupling means. Between the third rotational member a and either of the other two rotational members c and s, which are formed by a carrier and a sun gear, there may be inserted a short-circuit coupling 27.

Figure 3:
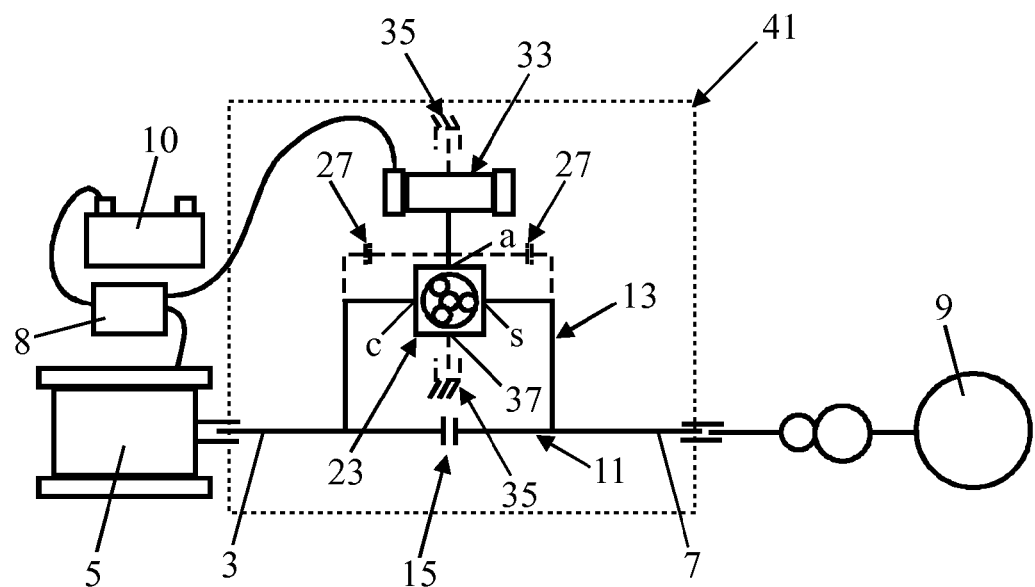
FIG. 3 shows a third embodiment of the transmission in which the gear reduction in the second transmission path is formed by a planetary gear set and the coupling is formed by an electromotor/generator.

FIG. 3 shows a third embodiment of the transmission according to the invention. All components that are equal to those of the first embodiment are designated by like reference numerals. In this transmission 31 the second coupling means are formed by a further electromotor/generator 33 which is connected to the electromotor/generator 5. Here too it is possible for a short-circuit coupling 27 to be positioned between the third rotational member a and either of the other two rotational members c and s. Furthermore, a locking brake 35 may then be connected to the further electromotor/generator 33 or to a fourth rotational member 37 of the planetary gear set 23.

Figure 4:
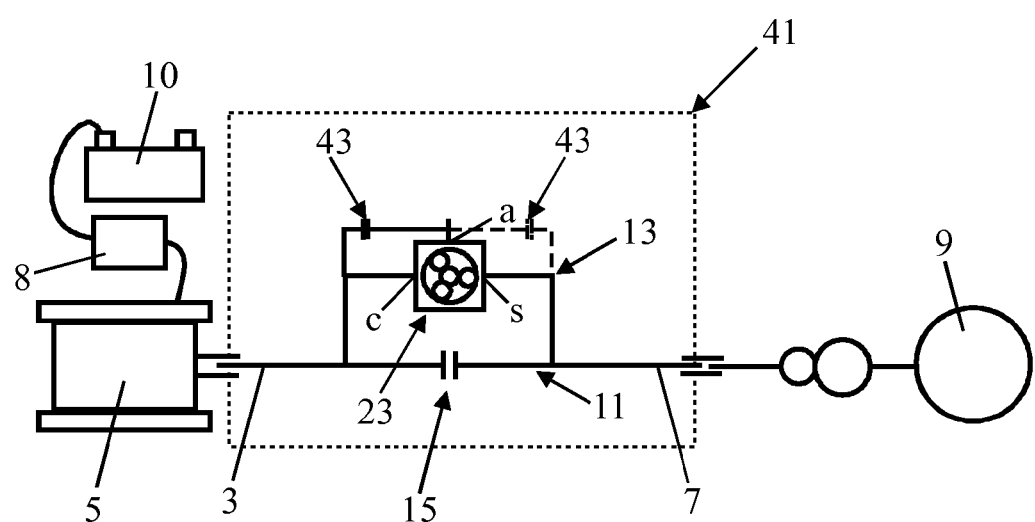
FIG. 4 shows a fourth embodiment of the transmission in which the gear reduction in the second transmission path is formed by a planetary gear set and the coupling by a short-circuit coupling.

FIG. 4 shows a fourth embodiment of the transmission according to the invention. All components that are equal to those of the first embodiment are designated by like reference numerals. In this transmission 41 the second coupling means are formed by a short-circuit coupling 43 which is positioned between the third rotational member a and either of the other two rotational members c and s.

In the previous embodiments the clutches and the brakes are actuated in an electromechanical manner.

Albeit the invention has been described in the foregoing based on the drawings, it should be observed that the invention is not by any manner or means restricted to the embodiment shown in the drawings. The invention also extends to all embodiments deviating from the embodiment shown in the drawings within the spirit and scope defined by the claims. For example in lieu of being formed by the electromotor/generator, the main drive may also be formed by a combustion engine. Alternatively, a further gear reduction or transmission may be positioned between the output and the load and/or between the input and the main drive.

What is claimed is:

1. A transmission for an electric or hybrid drive, which has an input which can be connected to an electromotor/generator or combustion engine that forms a main drive, and an output which can be connected to a load, which transmission comprises:
   two parallel transmission paths between the input and output, wherein the two parallel transmission paths are distinct paths without any overlapping components, which each extend from the input of the electromotor/generator or combustion engine, to the output of the load;
   first coupling means being present in a first one of the two transmission paths and second coupling means being present in the other, second transmission path, and
   a gear reduction having a gear ratio unequal to 1 being present in at least either of the two transmission paths,
   the maximum amount of power the first coupling means can dissipate is less than the maximum amount of power the second coupling means can dissipate,
   wherein each of the coupling means can be a clutch comprising two parts which can be connected together, or a brake or electromotor/generator in combination with a planetary gear set having at least three rotating members, wherein in case the coupling means is a clutch, the first part is uninterruptedly connected to the input, and the second part is uninterruptedly connected to the output directly or via the gear reduction or, in case the coupling means is a brake or an electromotor/generator, this brake or electromotor/generator is connected to a third rotational member of the planetary gear set of which a first rotational member is uninterruptedly connected to the input and yet a second rotational member is uninterruptedly connected to the output directly or via the gear reduction.

2. A transmission as claimed in claim 1, wherein the gear reduction is formed by a planetary gear set having at least three rotational members of which a first rotational member is connected to the input and a second rotational member is connected to the output.

3. A transmission as claimed in claim 2, wherein the third rotational member is connected to the first or second coupling means.

4. A transmission as claimed in claim 2, wherein the first or second coupling means is positioned between the third rotational member and either of the other two rotational members.

5. A transmission as claimed in claim 2, wherein a short-circuit coupling is positioned between the third rotational member and either of the other two rotational members.

6. A transmission as claimed in claim 1, wherein the second coupling means are formed by a clutch or a brake.

7. A transmission as claimed in claim 6, wherein the second coupling means are formed by a dry plate clutch or a dry plate brake.

8. A transmission as claimed in claim 1, wherein the first coupling means comprise a claw clutch or a claw brake.

9. A transmission as claimed in claim 8, wherein the first coupling means further comprise a freewheel bearing or a synchronisation element.

10. A transmission as claimed in claim 1, wherein the first coupling means are formed by a friction clutch or a friction brake.

11. A transmission as claimed in claim 2, wherein the planetary gear set forms an accelerating or decelerating gear reduction from the input to the output if the third rotational member is braked.

12. A transmission as claimed in claim 2, wherein a further gear reduction or transmission is present between the output and the load or between the input and the main drive.

13. A transmission for an electric or hybrid drive that include an electromotor/generator or combustion engine that forms a main drive, and a load, the transmission comprising:
   an input which can be connected to the main drive;
   an output which can be connected to the load;
   which transmission comprises two parallel transmission paths between the input and output, a first coupling means being present in a first one of the two transmission paths, and second coupling means being present in the other, second transmission path, wherein the two parallel transmission paths are distinct paths without any overlapping components, which each extend from the input to the output;
   a gear reduction having a gear ratio unequal to 1 being present in at least either of the two transmission paths;
   wherein the first coupling means includes a dry plate clutch, a synchromesh, or a claw clutch;
   wherein the second coupling means includes a friction clutch or a brake, which friction clutch or brake operates in slipping manner so as to be capable of dissipating power; and
   wherein each of the coupling means can be a clutch comprising two parts which can be connected together, or a brake or electromotor/generator in combination with a planetary gear set having at least three rotating members, wherein in case the coupling means is a clutch, the first part is uninterruptedly connected to the input, and the second part is uninterruptedly connected to the output directly or via the gear reduction or, in case the coupling means is a brake or an electromotor/generator, this brake or electromotor/generator is connected to a third rotational member of the planetary gear set of which a first rotational member is uninterruptedly connected to the input and yet a second rotational member is uninterruptedly connected to the output directly or via the gear reduction.

\* \* \* \* \*